United States Patent
Tang et al.

(10) Patent No.: US 9,221,452 B2
(45) Date of Patent: Dec. 29, 2015

(54) SYSTEM AND METHOD FOR OPTIMIZING FUEL ECONOMY USING PREDICTIVE ENVIRONMENT AND DRIVER BEHAVIOR INFORMATION

(75) Inventors: Zhijun Tang, Novi, MI (US); Michael P. Nowak, Milwaukee, WI (US); Benjamin Saltsman, Bloomfield Township, MI (US); Dnyaneshwar L. Ambhore, Pashan (IN); Benjamin Morris, Ann Arbor, MI (US); Vasilios Tsourapas, Northville, MI (US); Chinmaya B. Patil, Farmington Hills, MI (US); Hassan Al-Atat, Chaska, MN (US)

(73) Assignee: Eaton Corporation, Cleveland, OH (US)

(*) Notice: Subject to any disclaimer, the term of this patent is extended or adjusted under 35 U.S.C. 154(b) by 1022 days.

(21) Appl. No.: 13/188,320

(22) Filed: Jul. 21, 2011

(65) Prior Publication Data

US 2012/0022764 A1    Jan. 26, 2012

Related U.S. Application Data

(60) Provisional application No. 61/366,322, filed on Jul. 21, 2010, provisional application No. 61/391,229, filed on Oct. 8, 2010.

(51) Int. Cl.
*B60W 10/06* (2006.01)
*B60W 10/11* (2012.01)
(Continued)

(52) U.S. Cl.
CPC .............. *B60W 10/06* (2013.01); *B60W 10/11* (2013.01); *B60W 30/1882* (2013.01);
(Continued)

(58) Field of Classification Search
CPC ............. B60K 31/0042; B60W 10/06; B60W 30/1882; B60W 50/087; B60W 50/10; B60W 10/11; B60W 2720/103; B60W 2550/20; B60W 2550/143; B60W 2550/402; B60W 2530/14; B60W 2540/30; Y02T 10/56
See application file for complete search history.

(56) References Cited

U.S. PATENT DOCUMENTS 5,048,631 A * 9/1991 Etoh ............................. 180/179
5,096,015 A * 3/1992 Akishino et al. ............... 180/179
(Continued)

FOREIGN PATENT DOCUMENTS

DE    10 2009 004 102 A1    7/2010

OTHER PUBLICATIONS

Toyota, Auto Shop 101, 2003 p. 2.*
(Continued)

*Primary Examiner* — Hieu T Vo
*Assistant Examiner* — Sherman Manley
(74) *Attorney, Agent, or Firm* — Fishman Stewart Yamaguchi PLLC

(57) ABSTRACT

Disclosed is an exemplary method for optimizing vehicle performance. The method includes determining an optimized drive torque for maximizing vehicle fuel economy and detecting a driver requested drive torque. A determination is made on whether the driver requested drive torque is performance related or safety related. The arbitrated drive torque is set to the optimized drive torque when it is determined that the driver requested drive torque is not performance and safety related. The arbitrated drive torque is set to the driver requested drive torque when it is determined that the driver requested drive torque is either performance or safety related.

20 Claims, 7 Drawing Sheets

(51) Int. Cl.
   *B60W 30/188* (2012.01)
   *B60W 50/08* (2012.01)
   *F02D 28/00* (2006.01)
   *B60W 50/10* (2012.01)

(52) U.S. Cl.
   CPC ............ *B60W 50/087* (2013.01); *F02D 28/00* (2013.01); *B60W 50/10* (2013.01); *B60W 2530/14* (2013.01); *B60W 2540/30* (2013.01); *B60W 2550/143* (2013.01); *B60W 2550/20* (2013.01); *B60W 2550/402* (2013.01); *B60W 2720/103* (2013.01); *Y02T 10/56* (2013.01)

(56) References Cited

U.S. PATENT DOCUMENTS

| | | | |
|---|---|---|---|
| 5,393,277 A * | 2/1995 | White et al. | 477/108 |
| 5,552,985 A * | 9/1996 | Hori | 701/93 |
| 5,898,282 A | 4/1999 | Drozdz et al. | |
| 5,954,617 A * | 9/1999 | Horgan et al. | 477/107 |
| 6,202,021 B1 * | 3/2001 | Kresse et al. | 701/93 |
| 6,242,873 B1 | 6/2001 | Drozdz et al. | |
| 6,895,930 B2 * | 5/2005 | Hurley et al. | 123/399 |
| 7,347,168 B2 * | 3/2008 | Reckels et al. | 123/41.11 |
| 7,424,868 B2 * | 9/2008 | Reckels et al. | 123/41.1 |
| 2004/0068359 A1 * | 4/2004 | Neiss et al. | 701/96 |
| 2005/0021222 A1 * | 1/2005 | Minami et al. | 701/123 |
| 2006/0293822 A1 * | 12/2006 | Lattemann et al. | 701/51 |
| 2008/0033624 A1 * | 2/2008 | Gronau et al. | 701/93 |
| 2009/0198396 A1 * | 8/2009 | Rodriguez et al. | 701/22 |
| 2009/0321153 A1 | 12/2009 | Boeckenhoff et al. | |
| 2010/0049400 A1 | 2/2010 | Duraiswamy et al. | |
| 2011/0106388 A1 | 5/2011 | Boeckenhoff et al. | |

OTHER PUBLICATIONS

English Translation of DE 102009004102 (15 pages).

* cited by examiner

SYSTEM AND METHOD FOR OPTIMIZING FUEL ECONOMY USING PREDICTIVE ENVIRONMENT AND DRIVER BEHAVIOR INFORMATION

CROSS REFERENCE TO RELATED APPLICATIONS

This application claims priority to U.S. provisional application Ser. No. 61/366,322, filed on Jul. 21, 2010, and U.S. provisional application Ser. No. 61/391,229, filed on Oct. 8, 2010, the disclosures of which are incorporated herein by reference in their entirety.

BACKGROUND

Driver bias may cause significant variations in the fuel economy of a vehicle. For example, studies conducted by the U.S. Environmental Protection Agency (EPA) have shown that, even when holding the vehicle and the route constant, driver behavior may account for up to 35% variation in fuel economy (FE).

Driver assistance systems for optimizing fuel economy may be categorized into two general groups based on their mechanisms of influence. Passive assistance systems include those where only advisory feedback is provided to the driver. In active assistance systems, system automation takes over some portion of vehicle control. Some active automation technologies work relatively independent of the driver, such as adaptive cruise control, and some work in conjunction with the driver, such as an automated/automatic transmission.

Passive driver assistance schemes for fuel economy have been around for some time. Many of the original equipment manufacturers (OEMs) offer some type of driver interface for fuel economy in at least some of their vehicle models. The commercial vehicle market, on the other hand, is typically dominated by aftermarket devices, which are often coupled with telematic solutions. In recent years, nomadic devices have also emerged, boosted by smart phone technology, but their effectiveness may be hindered due to limited access to the vehicle's data bus and limited capability as a driver interface.

Existing fuel-economy interface devices may provide visual feedback of instantaneous or average fuel economy. Some may also provide a fuel efficiency "score" to the driver. The existing interface devices, however, are not noted for providing actionable information to the driver in terms of which behavior is related to poor fuel economy or how to operate the vehicle in a more fuel-efficient manner. In addition, existing fuel economy driver feedback schemes are typically based on vehicle operations rather than the driver's interaction with the vehicle operating environment. For example, an aggressive driver braking hard while tailgating may be rated the same as a conservative driver being forced to brake hard because another vehicle suddenly cut in front of him, as both will lead to the same hard braking event and the same fuel economy assessment. As a result, the fuel economy score or rating given to the driver is often confusing and misleading, which makes it difficult for both the driver to make use of the data.

Currently there is a general lack of actionable information and a poor differentiation between driver-caused and environment-caused fuel economy inefficiency. Both of these factors limit the effectiveness of existing fuel-economy driver interface technologies. In addition, since the driver's response to any passive feedback is typically going to be slow and coarse by nature, passive feedback may become distracting and ineffective in situations that require fast, frequent, or high-accuracy response from the driver.

As for active feedback technologies, examples include synthetic brake pulse or acceleration resistance, road speed governor, automated/automatic transmission, and standard or adaptive cruise control, to name a few. Some of these technologies were not intentionally introduced for the purpose of improving fuel efficiency, but have advanced in recent years to assist fuel economy determinations. For instance, current automated/automatic transmissions may have the capability of estimating road grade and load and adjusting gearshift schedule for better fuel economy.

Existing active feedback devices, however, have limitations similar to passive devices. Many existing active feedback solutions do not have the intelligence to differentiate between driver-caused and environment-caused fuel economy inefficiency. In addition, many of the control strategies employed in active assistance solutions are based only on instantaneous information, such as the load-based gearshift scheduling of many newer automated/automatic transmissions.

Achieving optimum driver behavior and powertrain operation to maximize fuel efficiency depends on the ability to estimate future conditions of the driver, vehicle and environment. Lack of knowledge of or inappropriate response to such future conditions may limit the effectiveness of vehicle automation systems. In recent years, progress in intelligent transportation systems (ITS) has increased availability of road and traffic information at both vehicle level and fleet level. Since fuel consumption is a cumulative measure over time, the optimality of instantaneous driver behavior is significantly dependent on future conditions. The availability of predictive road and traffic information from modern ITS technologies, such as global positioning systems (GPS), digital maps and radars, make it feasible and affordable to reduce driver bias through enhanced driver feedback and/or powertrain automation. Most of the early solutions have been focused on utilizing predictive topographical information to reduce fuel consumption in a cruise control context, where the vehicle is switching between full autonomy and full driver control per driver's choice. Since the fuel-efficient control strategy will only be active in the full autonomy mode, accurate, predictive sensor information is generally required to enable the system to make appropriate decisions consistently to avoid frequent driver intervention. With the help of technologies such as GPS and digital maps, reasonably accuracy information is readily available for simple and largely static environments, such as long distance travel on an open freeway. For the more complex urban environment, where future traffic conditions may be fluid and unpredictable, sensor and decision errors are inevitable and the driver is more likely to simply take over control of the vehicle, which makes cruise-control based solutions less effective.

DETAILED DESCRIPTION

Figure 1:
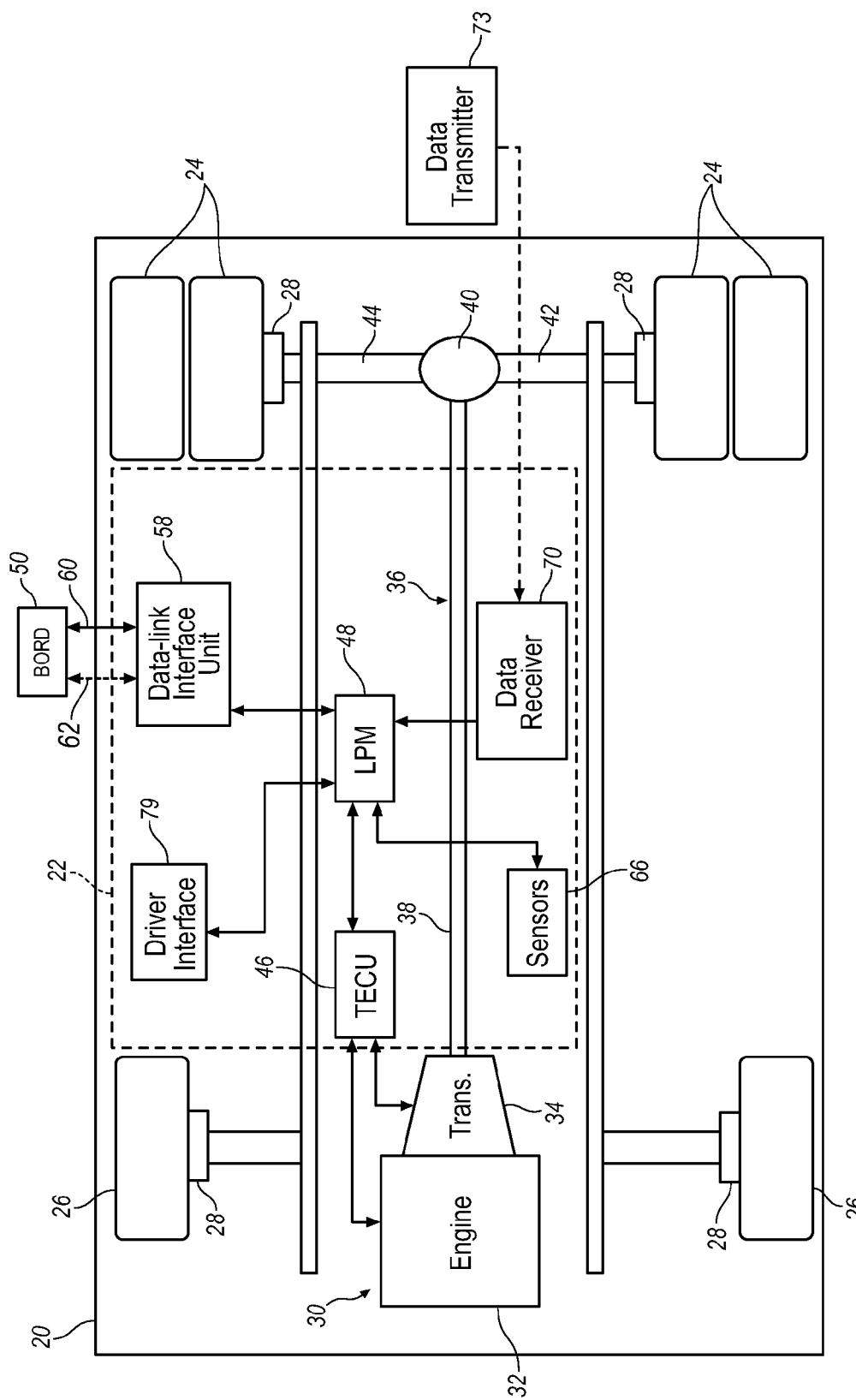
FIG. 1 is a schematic illustration of an automotive vehicle employing an exemplary active driver assistance system (ADAS)

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive, otherwise limit, or restrict the claims to the precise forms and configurations shown in the drawings and disclosed in the following detailed description.

Figure 2:
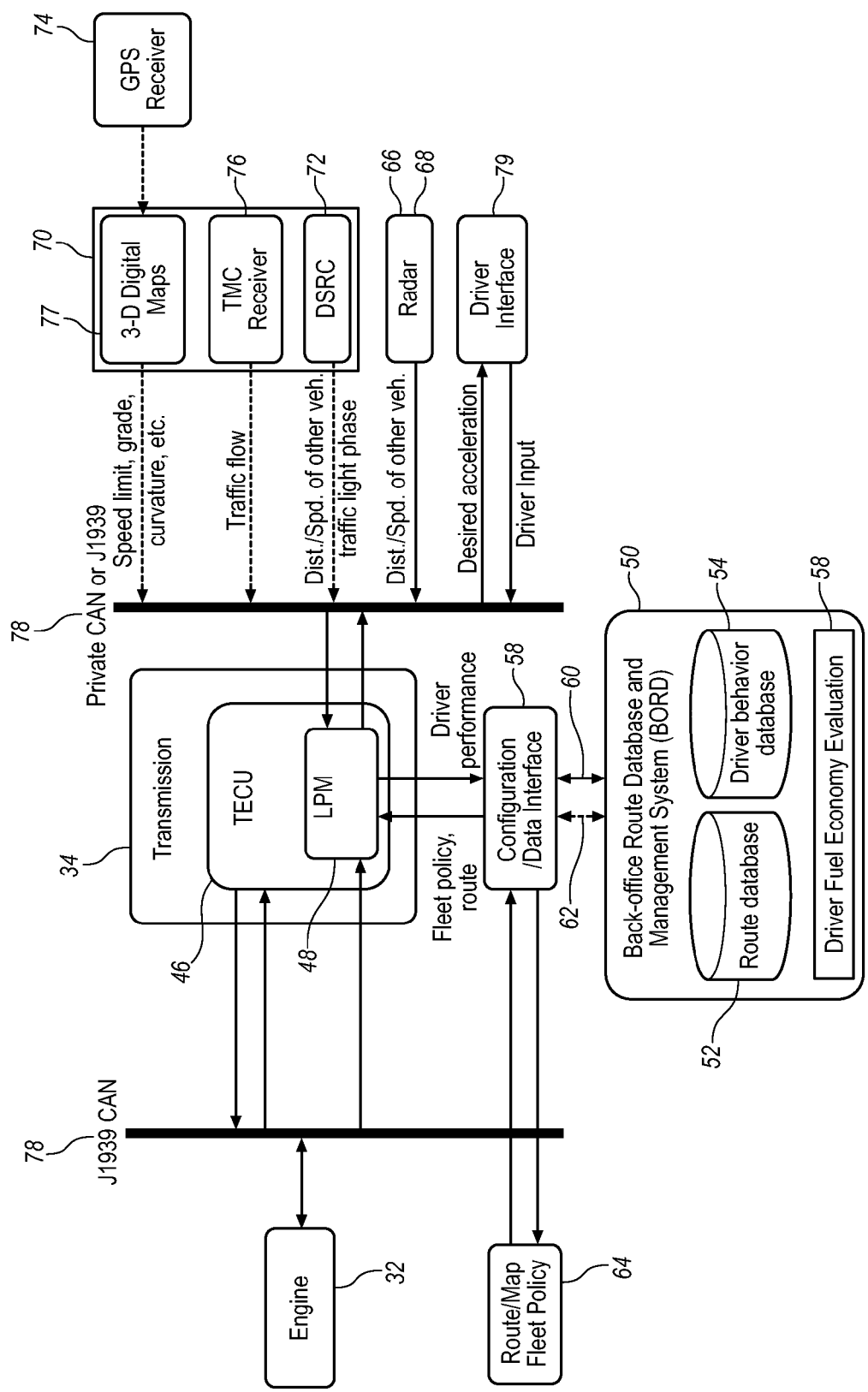
FIG. 2 is a more detailed schematic illustration of the ADAS of FIG. 1.

FIG. 1 schematically illustrates a motor vehicle 20 employing an exemplary active driver assistance system (ADAS) 22 for optimizing vehicle fuel economy. For purposes of discussion, the features and operation of ADAS 22 are described primarily in connection with a goal of maximizing fuel economy, but it shall be appreciated that the features of ADAS 22 may also be utilized to improve other performance characteristics in addition to fuel economy, for example, minimizing vehicle wear and tear and travel time. An exemplary arrangement of ADAS 22 is illustrated in more detail in FIG. 2. More specifically, FIG. 2 schematically illustrates the exemplary arrangement of the various elements of ADAS 22. As noted above, the disclosed arrangement is merely to facilitate discussion and the arrangement is not limiting. Moreover, certain elements may be added or removed without compromising the relevant operation of ADAS 22.

ADAS 22 may be configured to interact with a vehicle driver and utilize driver input when formulating a strategy for maximizing fuel economy. ADAS 22 generally operates in the background to continuously formulate and update vehicle operating strategies to maximize fuel economy and evaluate whether and how to communicate with or influence the driver's operation of the vehicle, through either active transmission/engine control and/or advisory driver feedback. ADAS 22 will not, however, request more power from the vehicle engine than requested by the driver. ADAS 22 may utilize historical and predictive information of both the vehicle operating environment (i.e., route and traffic information), as well as how the vehicle is being operated by the driver. The information may be obtained from on-board vehicle sensors, digital maps, vehicle-to-vehicle (V2V) communication systems, and vehicle-to-infrastructure (V2I) communication systems.

The environment factors effecting fuel economy may be separated from driver behaviors factors, with the environment factors being categorized into individual driving scenarios. Driver assistance decisions may be based on real-time scenario recognition and scenario-specific strategies that target non-safety related driving behavior and which may significantly effect fuel economy. Although ADAS 22, as described herein in an exemplary manner, is particularly applicable to commercial vehicles having an automated/automatic transmission, it may also be employed with other vehicle configurations as well, including semi-automatic and manual shift transmissions.

Continuing to refer to FIG. 1, vehicle 20 may include four rear drive wheels 24 and two front non-drive wheels 26. In other illustrative configurations, all wheels may be drive wheels. Moreover, there may be more or fewer wheels for vehicle 20. Operably associated with each of the wheels 24 and 26 may be a conventional type of wheel brake 28.

Vehicle 20 includes a vehicle drive system, generally designated 30. Vehicle drive system 30 includes a vehicle engine 32 and a transmission 34. Transmission 34 operatively connects to engine 32 and transmits drive torque generated by engine 32 to rear drive wheels 24. Extending rearward from the transmission 34, and also forming a portion of vehicle drive system 30, is a drive-line, generally designated 36. A drive shaft 38 interconnects transmission 34 to an inter-wheel differential 40 for transferring drive torque to a left rear axle shaft 42 and right rear axle shaft 44. Drive-line 36 is illustrated and described as including shafts 38, 42 and 44 primarily to facilitate understanding of the overall vehicle drive system 30, and not by way of limitation. For example, in the illustrated vehicle 20, and by way of example only, drive shaft 38 is illustrated as including a single shaft, but in practice may be configured to include additional shafts connected by way of universal joints or other suitable coupling mechanisms.

Vehicle 20 may include a transmission/engine control unit (TECU) 46 for controlling operation of engine 32 and transmission 34. TECU 46 may receive signals generated by various engine, transmission and vehicle sensors, and process the signals to control operation of engine 32 and transmission 34. Although illustrated as a separate component from transmission 34, TECU 46 may also be integrated with transmission 34. Moreover, TECU 46 may be a single computing module or a plurality of computing modules at different locations within vehicle 20 and communicatively connected as discussed in more detail below.

Referring to FIGS. 1 and 2, ADAS 22 may include an on-board look-ahead powertrain management module (LPM) 48 that may provide primary control of the ADAS system. LPM 48 may form a portion of the more general system based TECU 46, or may be in operational communication with TECU 46. LPM 48 may include, for example, a microprocessor, a central processing unit (CPU), and a digital controller, among others.

LPM 48 may employ a mix of passive and active driver assistance system architecture aimed at improving vehicle fuel economy by assisting the driver to optimize a vehicle drive-cycle with respect to fuel economy without compromising safety, operating comfortableness, or the productivity of the vehicle operator. Fuel economy optimization may be achieved through a combination of engine and transmission shift and drive torque controls and actionable driver feedback. When employed with commercial vehicle fleets, LPM 48 may also provide commercial fleet managers with actionable driver fuel economy performance information. Depending on the requirements of a particular application, LPM 48 may be fully integrated with TECU 46, or configured as a slave module of TECU 46.

With continued reference to FIGS. 1 and 2, LPM 48 may be configured to communicate with an externally located back-office route/driver database (BORD) 50 for storing various information used in connection with ADAS 22. BORD 50 may include a route database 52 configured to store data on a particular route that vehicle 20 operates, as well as a compilation of historical real-time traffic information occurring over the route. BORD 50 may also be configured store three-dimensional coordinates of a road network that vehicle 20 will be operating on, and the corresponding traffic constraints, such as speed limits, traffic lights, stop signs, and real-time traffic information. The real-time traffic information may be provided by a third-party service. The information stored on BORD 50 may include high-fidelity, third-party digital maps, or may be derived from aggregated route data received from LPM 48 over time. In the case of the latter, BORD 50 may also include a route learning module that compiles a knowledge base of the road network over time by combining route information learned from vehicle 20 and other vehicles through their daily operations.

BORD 50 may also maintain an operator driving behavior database 54 for each driver of vehicle 20, which may be updated over time using data received from LPM 48. Driving performance data with respect to individual operating scenarios may be downloaded and stored on BORD 50. BORD 50 may also include a driver fuel economy performance evaluation module 58 configured to evaluate each driver's fuel economy under various operating scenarios.

Although illustrated as a component separate from vehicle 20, BORD 50 may be configured as a simplified on-board sub-module of LPM 48.

A data-link interface unit 58 selectively establishes a wired 60 and/or wireless 62 communication link between LPM 48 and BORD 50. For purposes of discussion, wireless communication links are indicated throughout the drawing figures by a dashed line, and wired communication links are indicated by a solid line. However, in practice, it may be possible for wired and wireless communication links to be used interchangeably depending on the requirements of a particular application. Data-link interface unit 58 may be used to upload pre-acquired (or learned-on-the-fly) route information and driver operating behavior data information to an on-broad route/driver behavior database 64 located on vehicle 20. Data-link unit 58 may also be used to download new route and driver operating behavior data compiled by ADAS 22 from recent trips to BORD 50. The route and driver operating behavior database 52,54 stored on BORD 50 may include a comprehensive digital map of an entire geographic region within which a business operates, and driving behavior information on multiple drivers. To minimized the size and cost of on-broad route/driver behavior database 64, the on-board database may be configured to only store route and driver operating information specific to a particular route vehicle 20 will be traveling. The upload and download process may occur at a vehicle distribution terminal before and after a trip, or may take place in real-time through wireless communication between BORD 50 and ADAS 22.

Information/data used by LPM 48 to formulate a vehicle operating strategy for maximizing fuel economy may be obtained from a variety of sensors and information systems, which may include conventional on-board sensors, such as radar, vision, and a vehicle databus, and information technology services (ITS), such as a global positioning system (GPS), three-dimensional digital maps, and vehicle-to-vehicle (V2V) and vehicle-to-infrastructure (V2I) communication devices. For example, ADAS 22 may include various on-board sensors 66 configured to provide information regarding the operating environment immediately surrounding vehicle 20. Sensors 66 collect information concerning potential obstacles, such as other vehicles, present within the immediate vicinity of vehicle 20. Data collected by sensors 66 may be used by ADAS 22 to estimate, for example, a distance between vehicle 20 and the adjacent vehicles, as well as a speed and trajectory of the adjacent vehicles. Sensors 66 may include radar 68 and vision sensors. ADAS 22 may further include one or more data receivers 70 for receiving data transmitted over various wireless communication systems. Such systems may include dedicated short range communication systems (DSRC) 72, which may include for example, vehicle-to-vehicle (V2V) communication devices. ADAS 22 may also receive data transmitted over dedicated government frequencies from a data transmitter 73, for example, a global positioning system (GPS) 74 that may be used to generate three-dimensional digital maps 77, and a traffic message channel (TMC) 76.

Information and data received from sensors 66, data receiver 70, and various other vehicle sensors, may be communicated to LPM 48 across a vehicle Controller Area Network (CAN) 78. A known communications standard defined by the Society of Automotive Engineers (SAE) is SAE J1939 for CAN-based communications. SAE J1587 is another possible communications standard that may also be used. Moreover, other communications standards, such as ISO9141 K, or other known standards, may be employed.

ADAS 22 may also include a driver interface 79 that operably communicates with LPM 48. Driver interface 79 provides the driver of vehicle 20 with information concerning fuel economy and feedback for modifying driving behavior to help maximize fuel economy. Driver interface 79 may included various visual displays, audio sources, such as speakers, and haptic devices. Haptic technology is a tactile feedback technology that takes advantage of a user's sense of touch by applying forces, vibrations, and/or motions to the user.

Figure 3:
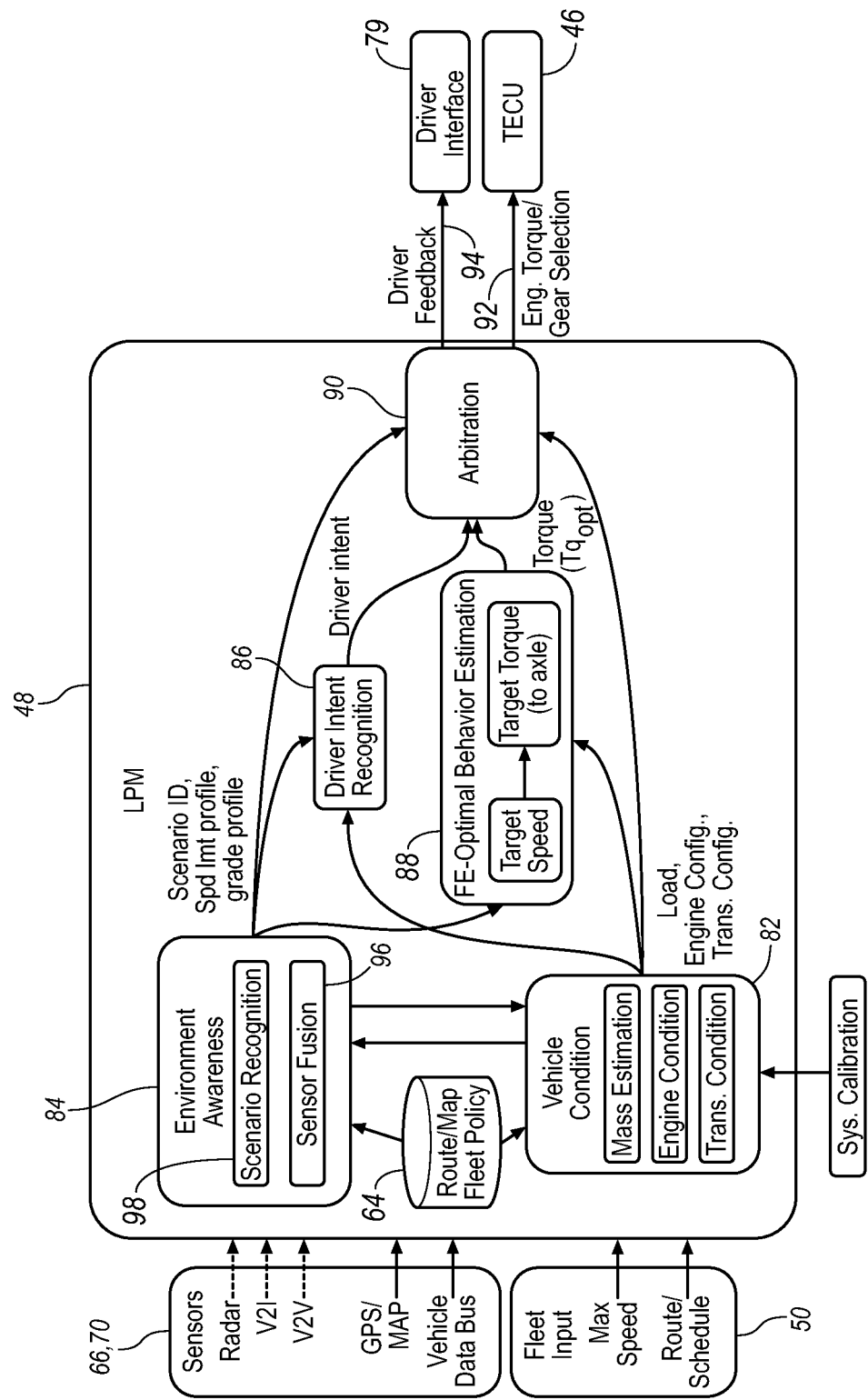
FIG. 3 is a schematic illustration of an exemplary look-ahead powertrain management module (LPM) that may be employed with the ADAS.

Referring to FIG. 3, LPM 48 may be configured to generate one or more output signals. For example, a first output signal 92 may be transmitted to TECU 46 for use in connection with controlling engine 32 and transmission 34. A second output signal 94 may be transmitted to driver interface 79. The output signals from LPM 48 may be used to provide engine drive torque/speed control, transmission shift control and advisory driver information (i.e., through driver interface 79). Although exemplarily configured LPM 48 is not described as employing brake control as a means for providing active assistance, the illustrated system architecture may nevertheless be adapted to include active safety features, such as brake control.

Continuing to refer to FIG. 3, LPM 48 may include five primary modules: a vehicle condition module 82; an environment awareness module 84; a driver intent recognition module 86; a FE-optimal behavior estimation module 88; and an arbitration module 90. Although identified as individual modules for purposes of discussion, in practice, the individual modules may be combined into one or more integrated modules. The modules may be implemented as a combination of hardware and software, and may include one or more software applications or processes for causing one or more computer processors to perform the operations of LPM 48. The preceding discussion is equally applicable to TECU 46, which as noted, above may incorporate LPM 48 in one exemplary approach. The operation of each module is described in more below.

Vehicle Condition Module (82)

Vehicle condition module 82 operates to estimate vehicle load. This may be accomplished, for example, by using an extended Kalman filter (KF) based method employing data provided by GPS 74, digital maps 77, and vehicle CAN 78. Vehicle load estimates may also be obtained through other means, such as private and governmental operated weigh stations. Vehicle condition module 82 may also determine engine and transmission configurations based on data received, for example, from vehicle CAN 78, or through offline calibration procedures.

Environment Awareness Module (84)

Environment awareness module (84) may include a sensor fusion module 96 and a scenario recognition module 98. The two modules are identified separately for purposes of discussion, but in practice, sensor fusion module 96 and scenario recognition module 98 may be integrated into fewer or more modules.

Figure 4:
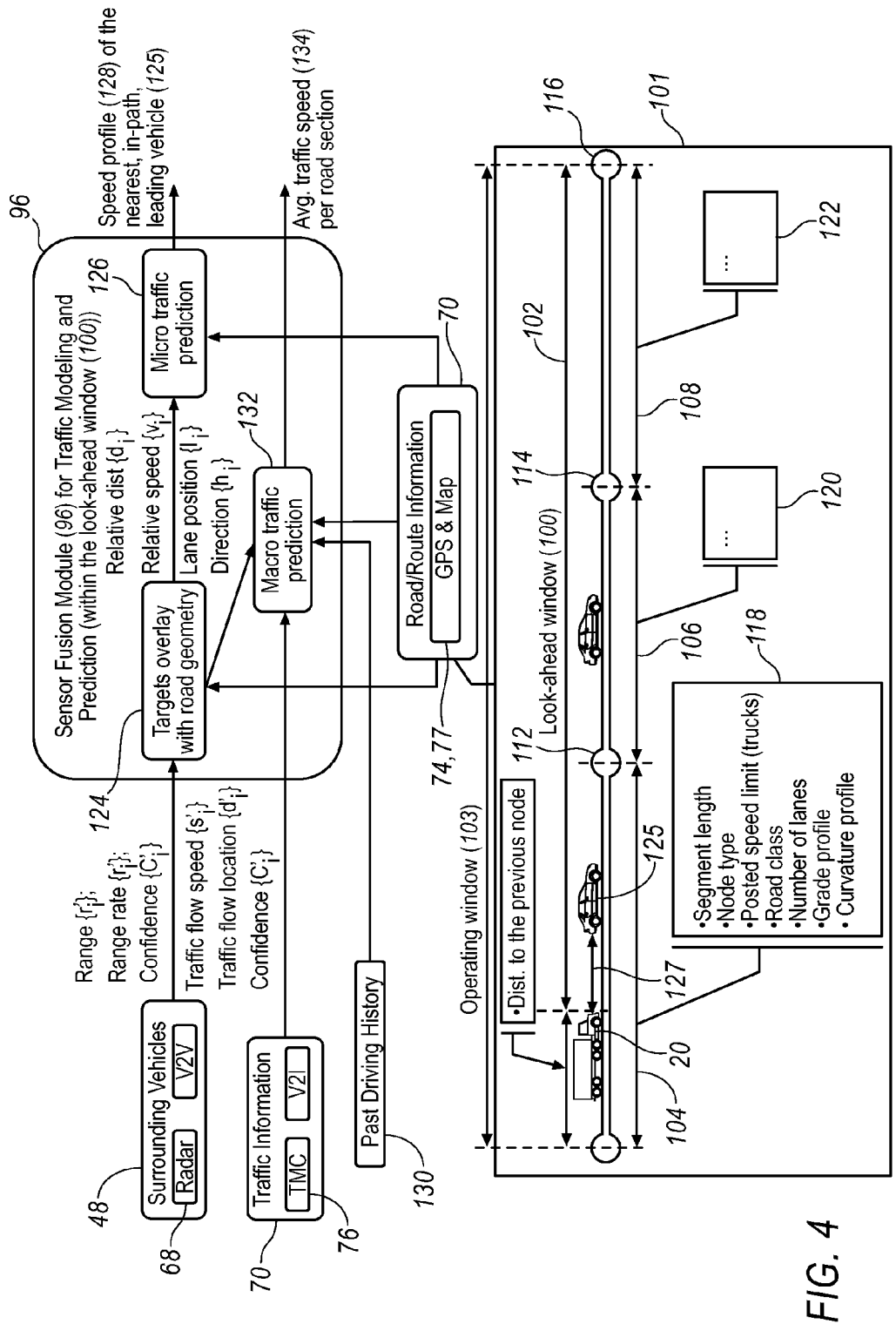
FIG. 4 is a schematic illustration of an exemplary sensor fusion module that may be employed with the LPM.

Referring also to FIG. 4, sensor fusion module 96 may employ an algorithm that utilizes the available sensor information from sensors 66 (FIG. 1) and data receiver 70 (FIG. 1) to predict future speed constraints that a driver may be facing within a look-ahead window 100. Sensor fusion module 96 receives information/data from on-board vehicle sensors 66 concerning the operating environment within an immediate vicinity of vehicle 20, and integrates that information/data with environment information/data received by data receiver 70 from various external data systems, such as GPS 74, traffic message channel (TMC) 76, and vehicle-to-infrastructure (V2I) communications. Sensor fusion module 96 may use the available sensor information/data to formulate a digital model 101 of the current vehicle operating environment occurring within an operating window 103. Operating window 103 includes look-ahead window 100, which extends a selected distance 102 in front of vehicle 20 along the vehicle's path of travel.

In the example illustrated in FIG. 4, operating window 103 is divided into three segments: a first segment 104; a second 106; and a third segment 108. In practice, however, operating window 103 may also be divided into fewer or more segments. Further, the number of segments need not remain constant, and may be varied based on various factors, including the operating environment in which vehicle 20 is operating. The operating environment may include, for example, road conditions (i.e., number of lanes, curvature of the road, whether the road or snow covered, etc.), traffic density and the proximity of other vehicles to vehicle 20.

Each segment 104, 106 and 108, may be defined by a starting node and an ending node. For example, a first node 110 corresponds to the starting node of segment 104, and a second node 112 correspond to its ending node. The ending node of a segment corresponds to the starting node of the next subsequent segment. For example, second node 112, which corresponds to the ending node of segment 106, also corresponds to the starting node of second segment 106. Similarly, a third node 114 correspond to the ending node of second segment 106, and the starting node of third segment 108. A fourth node 116 corresponds to an ending node of third segment 108. First node 110 also coincides with a beginning of operating window 103, and fourth node 116 coincides with an end of operating window 103. Operating window 103 may be continuously updated in order that vehicle 20 is never located outside the beginning and ending boundaries of operating window 103, as defined by first node 110 and fourth node 116.

Sensor fusion module 96 may generate a road condition database 118 that may include information on road conditions occurring within first segment 104, such as, for example, a length of the segment, the node type, posted speed limits, road class, number of lanes, and grade and curvature profiles. Exemplary node types may include a point at which a speed change occurs, an intersection, traffic light, stop sign and other points of the road where either road topology or a road speed limit change occurs. Similar road condition databases 120 and 122 may be compiled for second and third segments 106 and 108.

Sensor fusion model 96 may receive information/data from various sources. For example, information/data concerning location and speed of vehicles traveling in the vicinity of vehicle 20 may be obtained from sensors 66, and may include an estimated actual distance (Range $\{r'_i\}$) between vehicle 20 and each adjacent vehicle, a speed (Range rate $\{r'_i\}$) of the adjacent vehicle, and a confidence factor (Confidence $\{C'_i\}$). Confidence $\{C'_i\}$ provides an indication of the accuracy of the data used to determine Range $\{r'_i\}$ and Range rate $\{r'_i\}$. Information/data concerning traffic patterns in the vicinity of vehicle 20 may be obtained from data receiver 70, which may include, for example, an estimated speed at which traffic is flowing within look-ahead window 100 (Traffic flow speed $\{s'_i\}$), a geographical location of the traffic flow (Traffic flow location $\{d'_i\}$), and a computed factor (Confidence $\{C'_i\}$). Confidence $\{C_i\}$ provides an indication of the accuracy of the data used to determine Traffic flow speed $\{s'_i\}$ and Traffic flow location $\{d'_i\}$. Sensor fusion model 96 may also receive road and route information from GPS and third party mapping services.

Sensor fusion module 96 uses the information received from sensors 68 and data receiver 70 to generate a digital target overlay with road geometry 124, which may be filtered through a bank of extended Kalman filter (EKF) type trackers to determine various operating parameters of a nearest in-path vehicle 125 relative to vehicle 20. The computed operating parameters may include a relative speed ($v_i$), a lane position ($l_i$), a direction ($h_i$); and a relative distance ($d_i$) of nearest in-path vehicle 125 relative to vehicle 20. Relative distance ($d_i$) takes into account the speed of the vehicles, and consequently, is typically less than the actual distance (Range $\{r'_i\}$). The computed properties may be used to determine an available space 127 between vehicle 20 and nearest in-path vehicle 125. The relative speed ($v_i$), lane position ($l_i$), direction ($h_i$) and relative distance ($d_i$) of nearest in-path vehicle 125 may be used in conjunction with the traffic flow information (when available) obtained by data receiver 70 to generate a micro traffic prediction model 126 describing traffic conditions occurring immediately in front of vehicle 20. Micro traffic prediction model 126 may be used to compute a speed profile 128 of nearest in-path vehicle 125.

The individual in-path vehicle information (i.e., relative speed ($v_i$), lane position ($l_i$), direction ($h_i$) and relative distance ($d_i$)) may also be integrated with the traffic flow information (when available) obtained by data receiver 70 and a historical host vehicle speed profile 130, which may be obtained, for example, from BORD 50, to generate a macro traffic prediction model 132. An averaged traffic speed profile 134 may be computed for each segment 104, 106 and 108 of operating window 103 using macro traffic prediction model 132.

With continued reference to FIG. 3 and Table 1 below, scenario recognition module 98 may use the output from sensor fusion module 96 (i.e., speed profile 128 of nearest in-path vehicle 125 and averaged traffic speed profile 134) to identify an operating scenario occurring within look-ahead window 100. Scenario recognition module 98 may include multiple predefined operating scenarios from which to select. Each operating scenario may be defined by mission and environment conditions that a driver encounters, and generally includes two attributes. The first attribute may include static environment constraints 136, shown in FIG. 5 and Table 1, and the second attribute may include dynamic environment constraints 138. Static environment constraints 136 may include, for example, road geometry and posted speed limits, which information may be obtained from GPS and digital map systems. Dynamic environment constraints 138, shown in FIG. 5 and Table 1, may include real-time traffic information, such as the relative speed and location of surrounding vehicles, and phasing of traffic lights located along the look-ahead window route. This information may be obtained from on-board sensors 66 (FIG. 1), which may include radar and vision systems, and remote information technology systems, such as vehicle-to-vehicle (V2V) and vehicle-to-infrastructure (V2I) communication devices that transmit information to data receiver 70.

The exemplary implementation of scenario recognition module 98 includes eight predefined operating scenarios. In practice, however, fewer or more operating scenarios may be defined depending on the requirements of a particular application. Each operating scenario may include a set of static environment constraints 136 and a set of dynamic environment constraints 138. For example, the eight predefined operating scenarios are arrived at by combining four sets of static environment constraints with two sets of dynamic environment constraints. The four sets of static environment constraints 136 may be include the following:

1. "Up-speed" 142: defined by a road segment in look-ahead window 100 that includes an increase in the posted speed limit, such as may occur when entering a freeway on-ramp or a segment of road following a stop sign;
2. "Down-speed" 144: defined by a road segment in the look-ahead window 100 that includes a decrease in the posted speed limit, such as may occur when exiting a freeway off-ramp or a segment of road approaching a stop sign;
3. "Speed keeping" 146: defined by a road segment in the look-ahead window 100 with a constant speed limit; and
4. "ELSE" 148: defined by a low speed environment or off-road condition, such as may occur in a parking lot and on a non-public service road.

The two sets of dynamic environment constraints 138 may include a "Traffic" condition and a "No Traffic" condition, depending on whether the traffic flow is significantly lower than the posted speed limit or there is an impeding vehicle in a path of travel of vehicle 20 (i.e., "Traffic").

Figure 5:
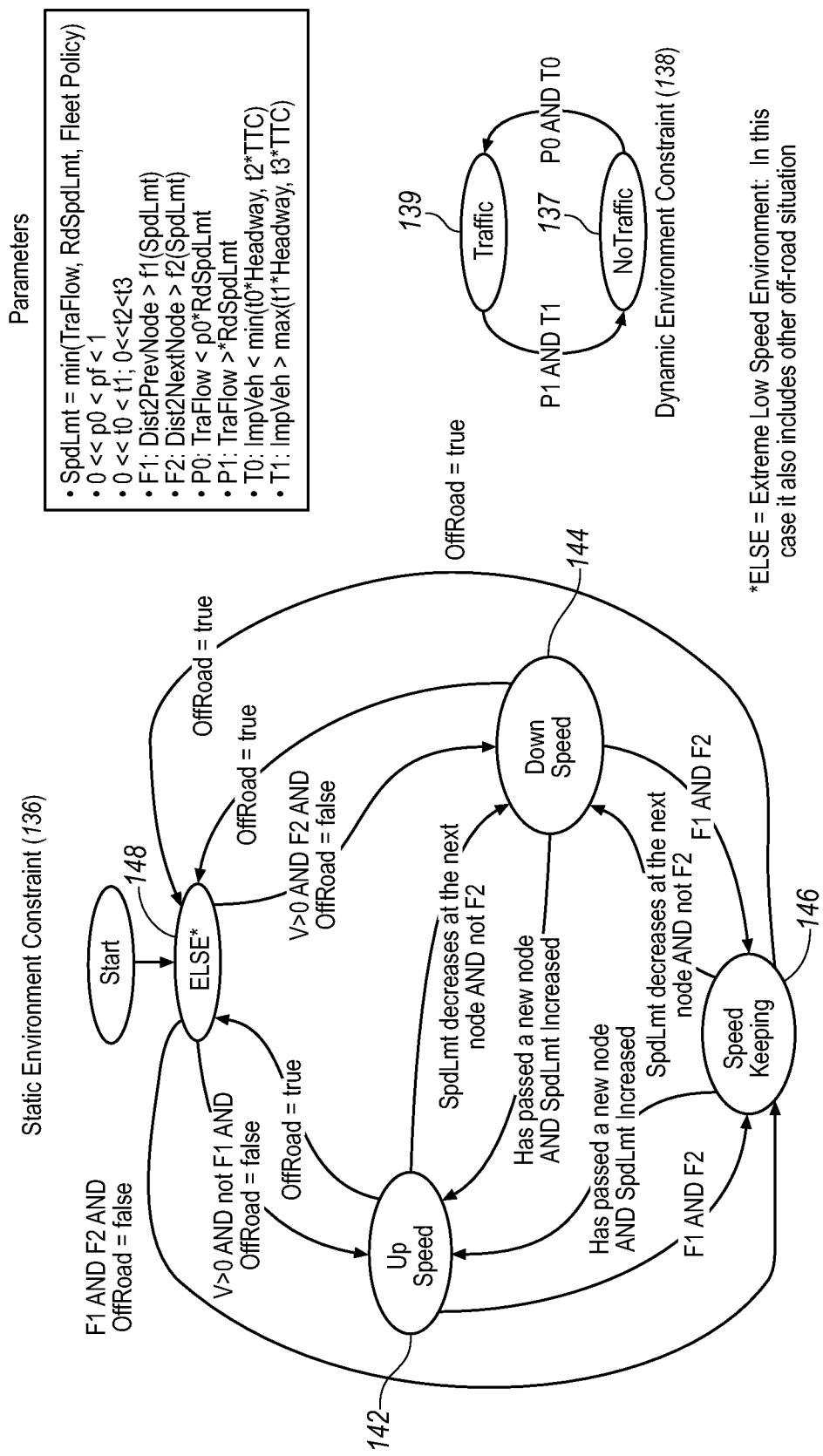
FIG. 5 schematically illustrates operation of an exemplary scenario recognition module that may be employed with the LPM.

LPM 48 may utilize a finite state algorithm to determine a current value of static environment constraints 136 and dynamic environment constraints 138. FIG. 5 schematically illustrates an exemplary decision making process that may be employed by the finite state algorithm to determine a current value of the static and dynamic environment constraints. The current value of static environment constraint 136 and dynamic environment constraint 138 may be determined by evaluating a value of various predefined parameters. The predefined parameters may include, for example, a first distance parameter (F1) and a second distance parameter (F2). First distance parameter (F1) corresponds to a condition in which a distance (Dist2PrevNode) between vehicle 20 and a node immediately behind vehicle 20 (i.e., node 110 in FIG. 4) is greater than a threshold distance computed as function of a maximum operating speed (SpdLmt) at which vehicle 20 may be operated. The maximum operating speed (SpdLmt) may correspond to the lesser of a speed of the surrounding traffic (TraFlow), a posted road speed limit (RdSpdLmt), and a maximum speed limit set in accordance with a vehicle fleet policy (FleetPolicy). Second distance parameter (F2) corresponds to a condition in which a distance (Dist2NextNode) between vehicle 20 and a node immediately proceeding vehicle 20 (i.e., node 112 in FIG. 4) is greater than a threshold distance computed as function of the maximum operating speed (SpdLmt) at which vehicle 20 may be operated.

The predefined parameters may also include a first speed parameter (P0) and a second speed parameter (P1). First speed parameter (P0) corresponds to a condition in which a speed of the traffic within look-ahead window 100 (TraFlow) is less than a first selected percentage (p0) of the posted road speed limit (RdSpdLmt). Second speed parameter (P1) corresponds to a condition in which the speed of the traffic within look-ahead window 100 (TraFlow) is greater than a second selected percentage (p1) of the posted road speed limit (RdSpdLmt). First and second percentages (p0) and (p1) are expressed in decimal form, and range between zero and one, with (p0) being less than (p1).

The predefined parameters may also include a first time parameter (T0) and a second time parameter (T1). First time parameter (T0) corresponds to a condition in which a distance (ImpVeh) between vehicle 20 and nearest in-path vehicle 125 is less than a minimum threshold value computed as a function of the following: a time (Headway) for vehicle 20 to travel the distance (ImpVeh) between vehicle between vehicle 20 and nearest in-path vehicle 125; the amount of time (TTC) it would take vehicle 20 to collide with nearest in-path vehicle 125 computed based on a relative speed between the two vehicles; and empirically determined factors (t1) and (t2). Factor (t1) has a value much greater than zero and less than (t2).

Second time parameter (T1) corresponds to a condition in which distance (ImpVeh) between vehicle 20 and nearest in-path vehicle 125 is greater than a maximum threshold value computed as a function of following: the time (Headway) for vehicle 20 to travel the distance (ImpVeh) between vehicle between vehicle 20 and nearest in-path vehicle 125; the amount of time (TTC) it would take vehicle 20 to collide with nearest in-path vehicle 125 computed based on a relative speed between the two vehicles; and empirically determined factors (t3) and (t4). Factor (t3) has a value much greater than zero and less than (t4).

The current value of the dynamic environment constraint 138 may be determined by evaluating the status of parameters P0, P1, T0 and T1. If it is determined that parameters P1 and T1 are satisfied, the dynamic environment constraint is set to "No Traffic" 137. If it is determined that parameters P0 and T0 are satisfied, the dynamic environment constraint is set to "Traffic" 139.

The current value of the static environment constraint 136 may be determined by evaluating a current speed (V) of vehicle 20; the status of parameters F0 and F2; whether vehicle 20 is being operated off-road (i.e., OffRoad=true) or on road (i.e., OffRoad=false); and whether a maximum operating speed (SpdLmt) of vehicle 20 is increasing or decreasing. Static environment constraint 136 is initially set to a value of "ELSE" 148. Static environment constraint 136 will also be set to "ELSE" 148 whenever vehicle 20 is operated off-road (i.e., OffRoad=true). Static environment constraint 136 transitions from "ELSE" 148 to "Up-Speed" 142 when it is determined that the velocity (V) of vehicle 20 is greater than zero (i.e., vehicle 20 is moving) and parameter F1 is not satisfied. Static environment constraint 136 transitions from "ELSE" 148 to "Down-Speed" 144 when it is determined that the velocity (V) of vehicle 20 is greater than zero (i.e., vehicle 20 moving) and parameter F2 is satisfied. Static environment constraint 136 transitions from "Up-speed" 142 to "Down-Speed" 144 when the maximum speed (SpdLmt) of vehicle 20 is set to decrease at the next node (i.e., node 112 in FIG. 4) and parameter F2 is not satisfied. Static environment constraint 136 transitions from "Up-speed" 142 to "Speed Keeping" 146 when both parameters Fl and F2 are satisfied. Static environment constraint 136 transitions from "ELSE" 148 to "Down-Speed" 144 when it is determined that the velocity (V) of vehicle 20 is greater than zero (i.e., vehicle 20 moving) and parameter F2 is satisfied. Static environment constraint 136 transitions from "Down-speed" 144 to "Up-Speed" 142 whenever vehicle 20 passes a new node (i.e., node 112 in FIG.

14) and the maximum speed (SpdLmt) of vehicle 20 has increased. Static environment constraint 136 transitions from "Down-speed" 144 to "Speed Keeping" 146 when both parameters F1 and F2 are satisfied. Static environment constraint 136 transitions from "ELSE" 148 to "Down-Speed" 144 when it is determined that the velocity (V) of vehicle 20 is greater than zero (i.e., vehicle 20 moving) and parameter F2 is satisfied. Static environment constraint 136 transitions from "Speed Keeping " 146 to "Up-Speed" 142 whenever vehicle 20 passes a new node (i.e., node 112 in FIG. 4) and the maximum speed (SpdLmt) of vehicle 20 has increased. Static environment constraint 136 transitions from "Speed Keeping" 142 to "Down-Speed" 144 when the maximum speed (SpdLmt) of vehicle 20 is set to decrease at the next node (i.e., node 112 in FIG. 4) and parameter F2 is not satisfied.

The control strategy implemented by LPM 48 is dependent on the current operating scenario in which vehicle 20 is operating. For example, with reference to Table 1 below, if static environment constraint 136 is set to "Up-Speed" 142, which may occur, for example, when vehicle 20 is operating on a road segment that includes an in increase in speed limit, such as a freeway on ramp, and a value of "No traffic" 137 is assigned to dynamic environment constraint 138, scenario recognition module 98 will determine that no intervention is necessary and LPM 48 will not attempt to influence the driving behavior of the vehicle operator. On the other hand, if static environment constraint 136 is set to "Down-Speed" 144, which may occur, for example, when vehicle 20 is exiting a freeway off-ramp, and a value of "Traffic" 139 is assigned to dynamic environment constraint 138, scenario recognition module 98 will determine there is a potential for intervening in the operation of vehicle 20 or otherwise influencing the driving behavior of the vehicle operator.

TABLE 1

| | Dynamic Environmental Constraints (138) | |
| --- | --- | --- |
| | No traffic (137) | Traffic (139) |
| Static Environmental Constraints (136) Up-Speed (142) | No intervention | Potential Intervention |
| Down-Speed (144) | Potential Intervention | Potential Intervention |
| Speed keeping (146) | Potential Intervention | Potential Intervention |
| ELSE (148) | No Intervention | No Intervention |

Environment awareness module 98 only determines if there is a potential for intervening in the operation of vehicle 20 and/or influencing the driving behavior of the vehicle operator. The decision on whether LPM 48 actually intervenes in the operation of vehicle 20, or otherwise attempts to influence the driving behavior of the vehicle operator occurs within arbitration module 90, which is described in more detail below.

FE-Optimal Behavior Estimation Module (88)

FE-optimal behavior estimation module 88 may use the output from environment awareness module 84 and vehicle condition module 84 to derive an optimized drive cycle (i.e., target speed profile v*(t)) by determining a fuel economy that may be achievable under the environment constraints determined by environment awareness module 84. Target speed profile v*(t) may include acceleration intensity and gearshift timing. Target speed profile v*(t) may be determined based on the following optimization scheme, where $D_{up}$ is a predicted travel distance profile assuming vehicle 20 will be following the micro/macro traffic flow as determined by environment awareness module 84. The result of this optimization process is a speed profile v*(t) that enables vehicle 20 to travel distance $D_{up}$ within look-ahead window 100 (FIG. 4) with minimum fuel usage and without having to pass any vehicles or incurring any additional travel time.

The following is an example of the calculations that may be employed by FE-optimal behavior estimation module 88 to compute speed profile v*(t):

$$v^*(t) = \underset{v(t)}{\mathrm{argmin}} \int_0^{TLookAhead} \mathrm{Fuel}(t) dt, \text{ such that}$$

Figure 6:
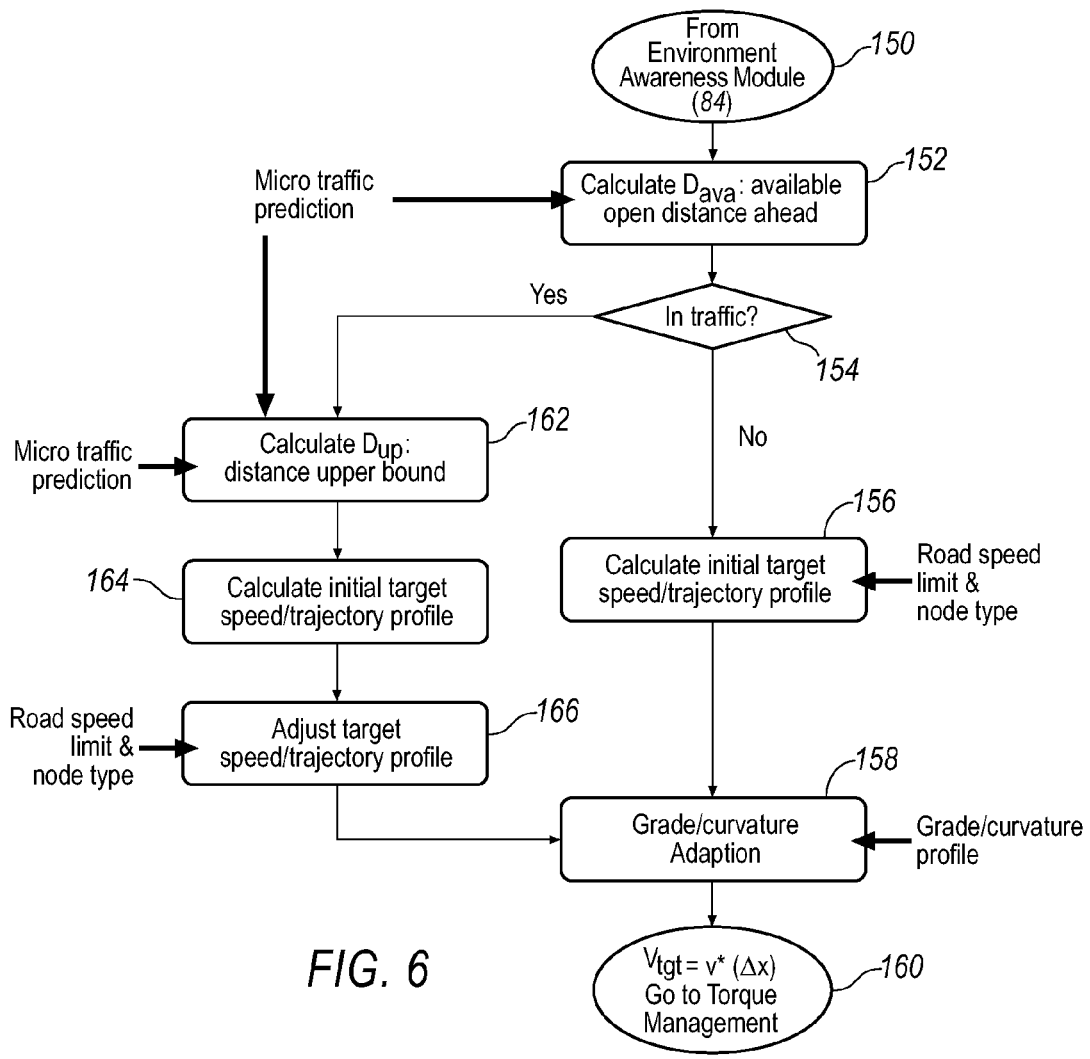
FIG. 6 illustrates an exemplary method for determining a vehicle speed profile for maximizing fuel economy.

$v^*(T) \leq V_{SpdLmt}(\int_0^T v(t)dt)$, for $\forall T, 0 < T \leq T_{LookAhead}$,
and $\int_0^t v^*(t)dt \leq D_{up}(t)$, for $\forall t, 0 < t \leq T_{LookAhead}$,
and $\int_0^{TLookAhead} v^*(t)dt = D_{LookAhead}$,
where $D_{up}(T_{LookAhead}) = D_{LookAhead}$
and where $T_{lookahead}$ is a user defined parameter that defines a forward time horizon over which the system will predict the FE-optimal behavior Depending on the particular scenario, the calculation of speed profile v*(t) may vary from computational sequence described above. An exemplary speed profile v*(t) computational method 148 is illustrated in FIG. 6. Information/data received from environment awareness module 84 (block 150) may be used in conjunction with macro traffic prediction 132 generated by sensor fusion module 96 to determine an average distance ($D_{avg}$) (block 152) that corresponds to an available open distance 127 (FIG. 4) between vehicle 20 and a nearest in-path vehicle 125 (FIG. 4) (block. A determination is made at block 154 on whether vehicle 20 is operating in traffic based on the status of dynamic environment constraint 138, as provided by environment awareness module 84. If dynamic environment constraint 138 is set to "No Traffic" (FIG. 5), the computation proceeds to block 156, where an initial target speed profile is determined based on the current road speed limit and node type. The computation then proceeds to block 158, where the previously computed speed profile may be modified, if necessary, to accommodate a particular grade and curvature of the road within look-ahead window 100. The resulting output (block 160) is a target speed profile v*(Δx), which may be used by FE-optimal behavior estimation module 88 to determine a corresponding engine/transmission optimized drive torque estimated to produce the target speed profile.

Continuing to refer to FIG. 6, if it is determined at block 154 that vehicle 20 is operating in traffic based on the status of dynamic environment constraint 138, the computation proceeds to block 162, where a travel distance $D_{up}$ within look-ahead window 100 (FIG. 4) is computed based on the macro/micro traffic prediction provided by environment awareness module 84. The process then proceeds to block 164, where an initial target speed profile is determined based on the determined travel distance $D_{up}$. The computation proceeds to block 166, where the previously computed initial speed profile may modified, if necessary, in accordance with a current road speed limit within look-ahead window 100 and a node type. The resulting output is a target speed profile v*(Δx), which may be used by FE-optimal behavior estimation module 88 to determine a corresponding engine/transmission optimized drive torque calculated to produce the target speed profile.

The computed target speed profile may be used to determine a corresponding throttle position, acceleration command or drive torque, for enabling vehicle 20 to track the target speed determined by FE-optimal behavior estimation module 88. This may be accomplished by tracking a reference command, such as a reference or a reference speed, using feedback linearization. The process may employ an approximate validated plant model for determining a drive torque estimated to achieve the target speed profile. A set of exemplary equations that may be employed by the plant model algorithm are described below. A vehicle speed (V) can be expressed as a function of engine torque ($T_e$), braking torque ($T_b$) and vehicle drag forces. These dynamic forces may be obtained from the validated plant model. The corresponding velocity dynamics, expressed in control affine form, are as follows:

$$\dot{V}=f_1(i)T_e+f_2u_b+f_3(V,\alpha) \quad (a)$$

where:
  i is the gear ratio;
  $u_b$ is a brake command; and
  $\alpha$ is a grade angle.

Since the disclosed exemplary configuration of ADAS 22 does not include control of brake command $u_b$, control over speed profile v*(t) may be accomplished by manipulating the engine torque $T_e$ produced by engine 32 and the gear ratio on the transmission to achieve the target speed $v_{target}$. Using first order speed error dynamics, the relationship between vehicle velocity (V) and target speed $V_{target}$ may be expressed as:

$$(\dot{V}-\dot{V}_{target})+k_v(V-V_{target})=0$$

$$\Rightarrow \dot{e}_v+k_v e_v=0 \quad (b)$$

Target speed $V_{target}$ may be assumed to have a relatively low rate of change, and as such, $\dot{V}_{target}$ closely approximates zero. This reduces equation (b) above to:

$$\dot{V}=-k_v(V-V_{target}) \quad (c)$$

Substituting equation (c) into equation (a) yields the following:

$$f_1(i)T_e+f_2u_b+f_3(V,a)=-k_v(V-V_{target}))+\dot{V}_{target} \quad (d)$$

Solving equation (d) for $T_e$ results in the following equation for computing an optimized drive torque $T_e$ estimated to attain the vehicle target speed $V_{target}$ for a particular gear option $$T_e=f_1(i)^{-1}(-k_v(V-V_{target})-f_2u_b-f_3(V,a)) \quad (e)$$

Multiple gear options may be feasible to achieve the same demand drive torque. In that case, the estimated vehicle fuel economy with respect to other feasible gear options may be estimated and the best gear selection with respect to fuel economy may be chosen and the corresponding engine torque may become the final recommended engine torque.

Driver Intent Recognition Module (86)

Operating in parallel with environment awareness module 84 and FE-optimal behavior estimation module 88, driver intent recognition module 86 accumulates historical driving data under various environment conditions. The compiled data may be used to formulate a statistical model for estimating a vehicle driver's current and future intent regarding the operation of vehicle 20, and estimate if the driver's actions are being executed, for example, in connection passing, merging, and performing a lane change, to name a few. Driver intent recognition module 86 provides information/data that may be used by arbitration module 90 when assessing whether to actively intervene in the operation of vehicle 20 and/or prompt the driver to modify their driving behavior.

Arbitration Module (90)

Figure 7:
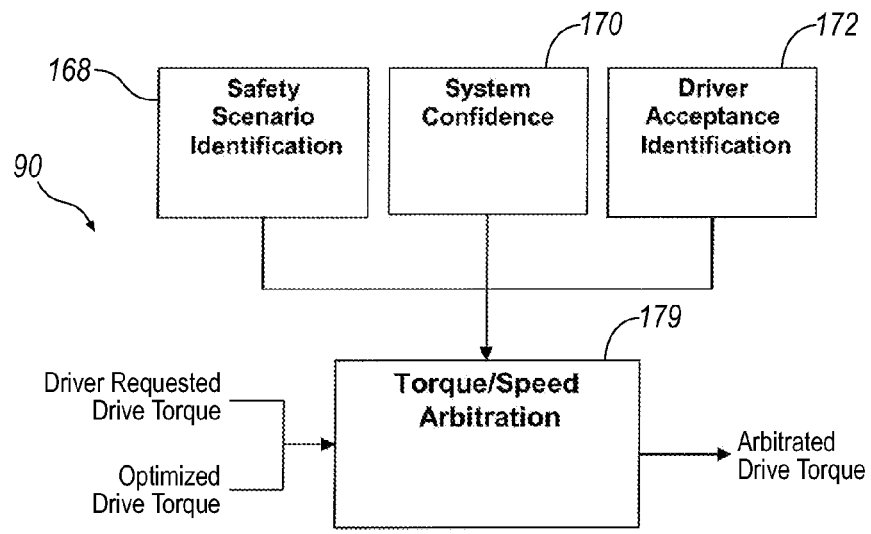
FIG. 7 is a schematic illustration of an exemplary arbitration module that may be employed with the LPM.

A schematic illustration of an exemplarily configured arbitration module 90 is illustrated in FIG. 7. Arbitration module 90 determines an arbitrated drive torque for propelling vehicle 20. The arbitrated drive torque may fall within a range bounded by and including the optimized torque determined by FE-optimal behavior estimation module 88 and a drive torque requested by the vehicle driver. The arbitrated drive torque may be used by various vehicle controls, such as TECU 46, to control operation of engine 32, for example, through manipulation of an engine throttle position, and transmission 34, for example, through initiation of a gear range shift. The arbitrated torque may also be used to formulate a strategy for passively prompting the driver of the vehicle to adjust their driving behavior, for example, by manually manipulating a vehicle accelerator pedal to adjust an engine throttle position, or manually initiating a transmission gear shift.

Arbitration module 90 may utilize the information/data compiled and/or determined by vehicle condition module 82, environment awareness module 84, driver intent recognition module 86, and FE-optimal behavior estimation module 88, when determining the arbitrated torque. Factors that may be considered include a difference between the driver demand/intent, as determined by driver intent recognition module 86, and the fuel economy optimal behavior profile, as determined by FE-optimal behavior estimation module 88. Another factor is the nature of the perceived driver intent, for example, whether the driver's actions are safety and/or performance related. In instances where environment awareness module 84 determines that driver assistance may benefit fuel economy (i.e., there is a potential for intervention, as indicated, for example, in Table 1), arbitration module 90 determines whether to provide advisory feedback to the driver or actively assist the driver through powertrain automation, for example, performing gearshifts and controlling engine torque and speed. The determination whether to engage in advisory feedback and active assistance may take into consideration related safety and drivability factors, the accuracy of the output from environment awareness module 84, and the manner in which the driver behavior deviates from the fuel economy optimal behavior determined by FE-optimal behavior estimation module 88.

When determining whether to actively intervene in the operation of vehicle 20 and/or encourage modifications in driving behavior, arbitration module 90 evaluates various sets of sub-scenarios. For purposes of discussion, exemplary arbitration module 90 is described as evaluating three sub-scenarios. In practice, however, fewer or more sub-scenarios may be specified. With reference to FIG. 7, the three exemplary sub-scenarios may include a safety scenario identification 168, a system confidence 170 and a driver acceptance identification 172.

Sub-scenario 168 is concerned with identifying safety and performance related events that may require a driver to maintain full control of vehicle 20. This may be accomplished by assessing the driver's intent to override the actions of LPM 48 in an effort to obtain complete and full control of vehicle 20, as may be indicated by the operation of various vehicle controls The following is an exemplary list of various vehicle controls and operating conditions that may be monitored by arbitration module 90 when evaluating vehicle safety and/or performance related conditions:
  a) Vehicle braking—indicated by a brake pedal position greater or lesser than zero;
  b) Decelerating—indicated by an accelerator pedal position at time $t_i$ that is greater than an accelerator pedal position at time $t_i+1$ for j consecutive time steps;
  c) Coasting—indicated by an accelerator pedal position at time $t_i+1$ that is less than an accelerator pedal position at time which is less than an accelerator pedal position at time $t_i+1$ for j consecutive time steps;

d) Just before changing lane—indicated by a turn signal on and vehicle (20) not decelerating;

e) Just before turning—indicated by turn signal on and vehicle (20) decelerating or coasting;

f) Attempting to catch a traffic light—indicated by the next node being a traffic light and vehicle (20) has passed a slowing down distance from the node (i.e., traffic light) and the vehicle (20) is not decelerating;

g) Just prior to commencing passing—(similar to changing lane); and h) Just prior to commencing merging—(similar to changing lane)

A safety flag is activated (i.e., set to "YES") if any of the above identified safety and/or performance conditions is detected by arbitration module 90.

Sub-scenario 172 is concerned the driver's acceptance or resistance to LPM 48 exerting control over the operation of vehicle 20. The following is a list of vehicle operating conditions, which if detected by arbitration module 90 may indicate the driver of vehicle 20 is resisting the actions of LPM 48:

a) Continuous driver demand for acceleration (CDA) (as indicated by the driver requested drive torque) that exceeds an LPM 48 determined optimized drive torque, and no deceleration detected for a certain time period, and which a previous arbitration was in disfavor of the driver's actions;

b) Driver fully actuating accelerator pedal—indicated by an accelerator pedal position greater than a threshold position; and c) Driver demand for acceleration under load—indicated by factors similar to CDA, but occurring over a shorter time period and the product of (road grade)×(vehicle mass) exceeds a threshold load.

A driver resistance flag is activated (i.e., set to "YES") if any of the above identified operating conditions is detected by arbitration module 90.

Sub-scenario 170 evaluates the accuracy of the information/data provided to the various LPM modules and assigns a corresponding rating value. By way of example, arbitration module 90 may employ three rating designations, including a "High Confidence", "Medium Confidence", and "Low Confidence".

Arbitration module 90 may transition between various operating modes depending on the status of the safety flag and the driver resistance flag. The exemplarily configured arbitration module 90 employs three operating modes, but in practice, fewer or more operating modes may be defined. The three operating modes may include the following:

a) Driver Mode 174—no intervention: arbitrated drive torque is equal to 100% driver requested drive torque;

b) LPM Mode 176—full intervention: arbitrated drive torque is equal to 100% LPM determined optimized drive torque; and c) Transition Mode 178—when transitioning between Driver Mode 174 and the LPM Mode 176, arbitrated torque may be ramped between the driver requested drive torque and the LPM determined optimized drive torque.

Figure 8:
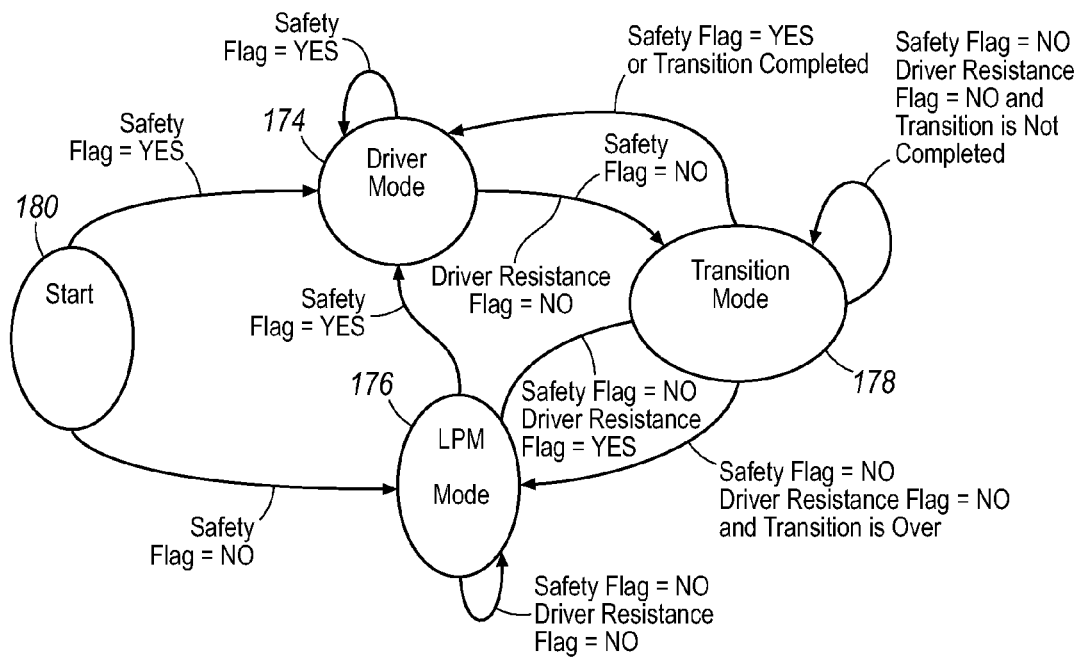
FIG. 8 schematically illustrates an exemplary operating scheme that may be employed with the arbitration module.

FIG. 8 schematically illustrates an exemplary arbitration algorithm 179 that may be employed by arbitration module 90. The decision process commences at start 180. Arbitration module 90 checks the status of the safety flag and driver resistance flag. If either flag is activated (i.e., set to "YES"), arbitration module 90 will proceed to activate Driver Mode 174. Driver Mode 174 will continue to remain activated so long as either the safety flag or driver resistance flag is activated (i.e., set to "YES"). If, on the other hand, arbitration module 90 determines that neither the safety flag nor the driver resistance flags are activated (i.e., both flags set to "NO"), arbitration module 90 will than proceed to activate LPM Mode 176. LPM Mode 176 will remain activated until either the safety flag or the driver resistance flag is activated (i.e., set to "YES").

Continuing to refer to FIG. 8, if the safety flag is activated (i.e., set to "YES") while operating in LPM Mode 176, arbitration module 90 will proceed to activate Driver Mode 174. If the driver resistance flag is activated (i.e., set to "YES") while operating in LPM Mode 176, and the status of the safety flag remains unchanged (i.e., set to "NO"), arbitration module 90 will proceed to activate Transition Mode 178. Arbitration module 90 will continue to operate in Transition Mode 178 so long as the safety flag is deactivated (i.e., set to "NO") and the transition between the LPM Mode and the Driver Mode has not yet been completed. If the safety flag is activated (i.e., set to "YES") while operating in Transition Mode 178, arbitration module 90 will proceed to activate Driver Mode 174. If the driver resistance flag is deactivated (i.e., set to "NO") while operating in Transition Mode 178, and the status of the safety flag remains unchanged (i.e., set to "NO"), arbitration module 90 will proceed to activate LPM Mode 176.

Continuing to refer to FIG. 8, if the safety flag is deactivated (i.e., set to "NO") while operating in Driver Mode 174, arbitration module 90 will proceed to activate Transition Mode 178. Arbitration module 90 will continue to operate in Transition Mode 178 so long as the safety flag is deactivated (i.e., set to "NO") and the transition between the LPM Mode and the Driver Mode has not yet been completed.

It will be appreciated that the exemplary active driver assistance system described herein has broad applications. The foregoing configurations were chosen and described in order to illustrate principles of the methods and apparatuses as well as some practical applications. The preceding description enables others skilled in the art to utilize methods and apparatuses in various configurations and with various modifications as are suited to the particular use contemplated. In accordance with the provisions of the patent statutes, the principles and modes of operation of the disclosed container have been explained and illustrated in exemplary configurations.

In general, computing systems and/or devices, such as TECU 46 and LPM 48 (when not incorporated into TECU 46), may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, and the Mac OS X and iOS operating systems distributed by Apple Inc. of Cupertino, Calif. Examples of computing devices include, without limitation, a module, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein such as those involved in BORD 50 (e.g., Route database 52 and Driver behavior database 54), may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., modules, servers, personal computers, etc.), stored on computer readable media associated therewith (e.g., disks, memories, etc.). A computer program product may comprise such instructions stored on computer readable media for carrying out the functions described herein.

It is intended that the scope of the present methods and apparatuses be defined by the following claims. However, it must be understood that the disclosed active driver assistance system may be practiced otherwise than is specifically explained and illustrated without departing from its spirit or scope. It should be understood by those skilled in the art that various alternatives to the configuration described herein may be employed in practicing the claims without departing from the spirit and scope as defined in the following claims. The scope of the disclosed container should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A method for optimizing vehicle performance, the method comprising:
   identifying at least one operating scenario from a list of predetermined operating scenarios, each of which indicates one of a potential for optimizing and no potential for optimizing;
   determining that there is a potential for optimizing fuel economy based on the at least one operating scenario identified;
   determining, by at least one computer module, an optimized drive torque;
   detecting a driver requested drive torque;
   determining if the driver requested drive torque is in response to at least one driving related condition;
   setting an arbitrated drive torque to the optimized drive torque when determining the driver requested drive torque is not in response to at least one driving related condition, and setting the arbitrated drive torque to the driver requested drive torque when determining the driver requested drive torque is in response to the at least one driving related condition;
   monitoring a driver resistance to setting the arbitrated drive torque to the optimized drive torque; and
   setting the arbitrated drive torque between the driver requested drive torque and the optimized drive torque when driver resistance is detected.

2. The method of claim 1, further comprising:
   determining if the detected driver requested drive torque is less than the determined optimized drive torque; and
   setting the arbitrated drive torque to the driver requested drive torque when determining the optimized drive torque to be greater than the driver requested drive torque.

3. The method of claim 2, further comprising setting the arbitrated drive torque to the driver requested drive torque whenever the optimized drive torque is determined to be greater than the driver requested drive torque.

4. The method of claim 2, further comprising monitoring operation of at least one vehicle control in connection with determining if the driver requested drive torque is in response to at least one driving related condition.

5. The method of claim 4, further comprising determining the driver requested drive torque is in response to at least one driving related condition when operation of the monitored vehicle control is detected.

6. The method of claim 4, wherein the at least one vehicle control includes at least one of a vehicle brake pedal position, vehicle accelerator pedal position, and vehicle turn signal.

7. The method of claim 1, wherein driver resistance is indicated by at least one of a driver requested drive torque exceeding the optimized drive torque for a selected time period, a fully actuated vehicle accelerator pedal, and a driver initiated request for drive torque occurring under a load condition.

8. The method of claim 1, further comprising:
setting the arbitrated drive torque to the driver requested drive torque when it is determined there is no potential for optimizing fuel economy.

9. The method of claim 1 further comprising:
determining at least one static environment constraint and at least one dynamic environment constraint; and
selecting the at least one operating scenario from the list of predetermined operating scenarios based on the at least one static environment constraint and the at least one dynamic environment.

10. The method of claim 9, wherein at least one of the static environment constraint and the dynamic environment constraint is determined based on a vehicle speed limit.

11. The method of claim 1, further comprising adjusting a vehicle throttle position in response to the arbitrated drive torque.

12. The method of claim 1, further comprising initiating a transmission gear shift in response to the arbitrated drive torque.

13. A method for optimizing vehicle performance, the method comprising:
determining, by at least one computer module, an optimized drive torque;
detecting a driver requested drive torque;
determining at least one static environment constraint occurring within a predetermined distance in front of the vehicle along a vehicle path of travel;
determining at least one dynamic environment constraint;
selecting an operating scenario from a list of predefined operating scenarios based on both the at least one static environment constraint and the at least one dynamic environment constraint;
determining if there is a potential for optimizing fuel economy based on the at least one operating scenario;
setting an arbitrated drive torque to the driver requested drive torque when determining there is no potential for optimizing fuel economy;
setting the arbitrated drive torque to the optimized drive torque when determining there is a potential for optimizing fuel economy;
monitoring a driver resistance to setting the arbitrated drive torque to the optimized drive torque; and
setting the arbitrated drive torque between the driver requested drive torque and the optimized drive torque when driver resistance is detected.

14. The method of claim 13, further comprising:
determining if the driver requested drive torque is in response to at least one driving related condition; and
setting the arbitrated drive torque to the optimized drive torque when determining the driver requested drive torque is not in response to at least one driving related condition, and setting the arbitrated drive torque to the driver requested drive torque when determining the driver requested drive torque is in response to at least one driving related condition.

15. The method of claim 14, further comprising monitoring operation of at least one vehicle control in connection with determining if the driver requested drive torque is in response to at least one driving related condition.

16. The method of claim 15, further comprising determining the driver requested drive torque to be in response to at least one driving related condition when operation of the monitored vehicle control is detected.

17. The method of claim 15, wherein the at least one vehicle control includes at least one of a vehicle brake pedal position, vehicle accelerator pedal position, and vehicle turn signal.

18. The method of claim 13, wherein driver resistance is indicated by at least one of a driver requested drive torque exceeding the optimized drive torque for a selected time period, a fully actuated vehicle accelerator pedal, and a driver initiated request for drive torque occurring under a load condition.

19. The method of claim 13, further comprising:
determining if the detected driver requested drive torque is less than the determined optimized drive torque; and
setting the arbitrated drive torque to the driver requested drive torque when determining the optimized drive torque to be greater than the driver requested drive torque.

20. The method of claim 1, wherein the determining of the optimized drive torque occurs during operation of the vehicle.

* * * * *